United States Patent [19]

Thompson

[11] Patent Number: 5,695,230
[45] Date of Patent: Dec. 9, 1997

[54] PANEL HANDLE

[76] Inventor: Charles Earl Thompson, 3703 McKenzie Ave., Los Angeles, Calif. 90032

[21] Appl. No.: 672,097

[22] Filed: Jun. 27, 1996

[51] Int. Cl.6 .................................................. B65G 7/12
[52] U.S. Cl. ............................... 294/15; 294/92; 254/131
[58] Field of Search .......................... 294/15–17, 26, 294/62, 92, 902, 19.1; 254/120, 131; 81/119

[56] References Cited

U.S. PATENT DOCUMENTS

| 1,031,964 | 7/1912 | Reinehr . | |
|---|---|---|---|
| 1,133,310 | 3/1915 | Nash | 294/15 |
| 1,448,999 | 3/1923 | Haarberg | 294/15 |
| 2,472,500 | 6/1949 | Swanson | 294/92 |
| 2,832,384 | 4/1958 | Wicks et al. | 254/131 |
| 2,967,730 | 1/1961 | Vann . | |
| 2,968,510 | 1/1961 | Ellis et al. | 294/15 |
| 3,041,101 | 6/1962 | Lebre | 294/16 |
| 3,122,354 | 2/1964 | Rodeback . | |
| 3,199,904 | 8/1965 | Lincoln . | |
| 3,237,979 | 3/1966 | Moody | 294/62 |
| 3,678,561 | 7/1972 | Mautz, Sr. | 254/131 |
| 3,958,825 | 5/1976 | Diamond | 294/92 |
| 4,856,834 | 8/1989 | Lancaster et al. . | |
| 4,982,987 | 1/1991 | Riggins et al. . | |

FOREIGN PATENT DOCUMENTS

| 1064-438 | 10/1979 | Canada | 294/15 |
|---|---|---|---|
| 3-177215 | 8/1991 | Japan . | |
| 581061 | 10/1976 | Switzerland | 294/92 |

*Primary Examiner*—Dean Kramer
*Attorney, Agent, or Firm*—Graham & James LLP

[57] ABSTRACT

A panel carrying apparatus further comprises a handle having a gripping portion disposed at a first end thereof. A plurality of interconnected wall members are coupled to a second end of the handle. The interconnected wall members define a rectangular channel that extends in a direction perpendicular to an axial direction of the handle, and can be removably attached to a workpiece intended to be carried. The interconnected wall members further comprise three wall members connected in a rectangular U-shape having a width dimension sufficient to permit a standard-sized stud to be engaged therein. In an embodiment of the invention, a plurality of set screws are used to attach the interconnected wall members to the workpiece.

1 Claim, 1 Drawing Sheet

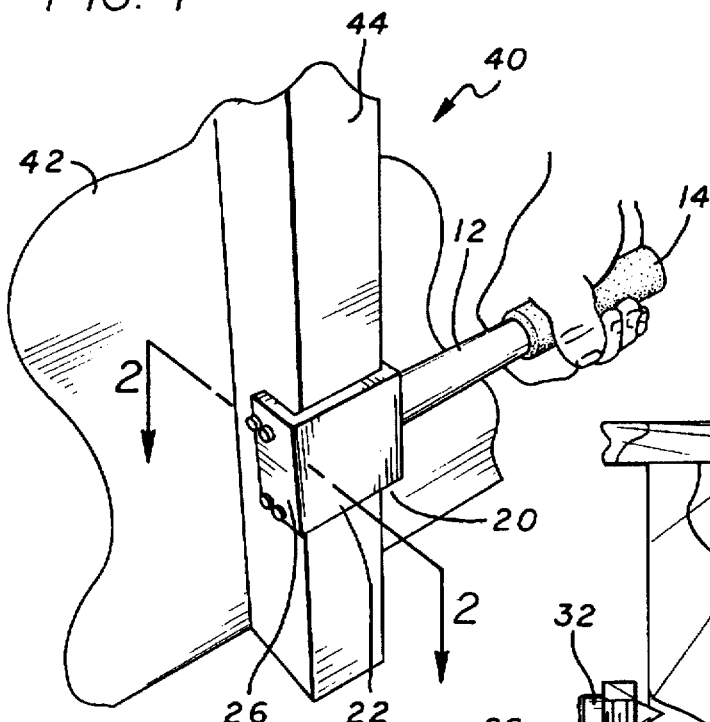
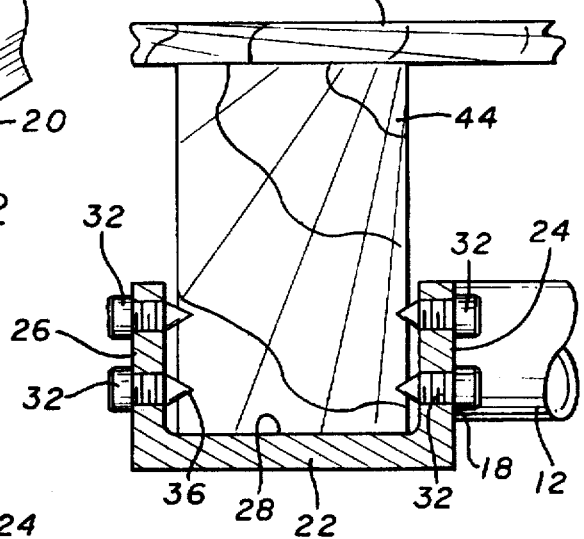
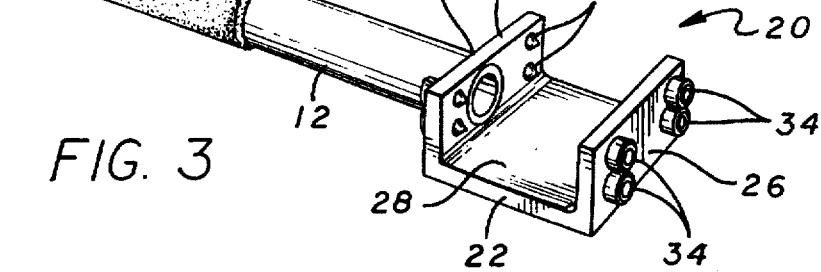
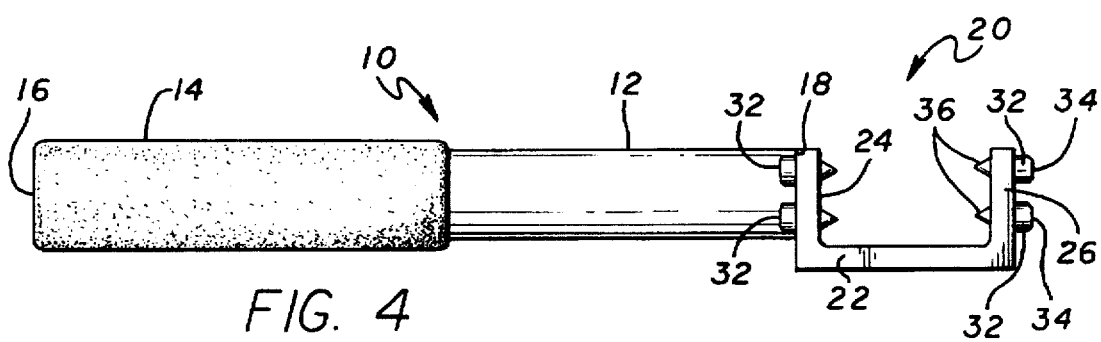

PANEL HANDLE

BACKGROUND OF THE INVENTION

1. Field of the Invention

The present invention relates to construction tools, and more particularly, to a novel panel handle that can be secured to a stud of a wood panel to permit the panel to be easily carried in an upright position.

2. Description of Related Art

In certain types of large scale construction projects, such as in construction of bridges, it is common to use wooden panels that serve as forms for the pouring of concrete. The wooden panels are typically rectangular in shape and provided by one or more sheets of plywood. A front surface of the panels is generally smooth to provide the internal surface of the forms that comes into direct contact with the concrete. A rear surface of the panels may include a plurality of studs that extend the length and/or width of the panels in order to provide rigidity for the panels. The panels may be rather large in size, having a length or width dimension of eight feet or more.

A drawback of such panels is that they are difficult to carry. The panels must often be carried in an upright position due to the confined working space in which the panels are used. Since automated equipment cannot maneuver in the confined space, the construction workers typically carry the panels by hand. This may be done either by grasping the studs that extend along the rear surface or by wedging the worker's forearm between adjacent studs. These carrying techniques are not desirable, and often result in injury to the construction worker. The studs generally have an unfinished surface that can splinter easily to injure a worker's hand or arm. Moreover, wedging a forearm between the adjacent studs can also result in injuries such as a bruised or dislocated joint. In some larger sized panels, the distance between the adjacent studs may be too great for use of the forearm wedging technique. Workers may also become injured by tripping or falling while carrying the panels.

In view of the aforementioned difficulties, it would be desirable to provide a safer way to carry the wooden panels. Such an improved carrying technique should be both easy to use and inexpensive in order to gain wide acceptance in the construction industry.

SUMMARY OF THE INVENTION

In accordance with the teachings of the present invention, a novel panel carrying apparatus is provided. The panel carrying apparatus allows a construction worker to easily and safely carry a wooden panel.

More particularly, the panel carrying apparatus further comprises a handle having a gripping portion disposed at a first end thereof. A plurality of interconnected wall members are coupled to a second end of the handle. The interconnected wall members define a rectangular channel that extends in a direction perpendicular to an axial direction of the handle, and can be removably attached to a workpiece intended to be carried. The interconnected wall members further comprise three wall members connected in a rectangular U-shape having a width dimension sufficient to permit a standard-sized stud to be engaged therein. In an embodiment of the invention, a plurality of set screws are used to attach the interconnected wall members to the workpiece.

A more complete understanding of the panel handle will be afforded to those skilled in the art, as well as a realization of additional advantages and objects thereof, by a consideration of the following detailed description of the preferred embodiment. Reference will be made to the appended sheets of drawings which will first be described briefly.

BRIEF DESCRIPTION OF THE DRAWINGS

FIG. 1 illustrates a panel handle in accordance with the present invention used to carry a typical wooden panel;

FIG. 2 is a partial sectional side view of the panel handle as taken through the section 2—2 of FIG. 1;

FIG. 3 is a perspective view of the panel handle; and

FIG. 4 is a side view of the panel handle.

DETAILED DESCRIPTION OF THE PREFERRED EMBODIMENT

The present invention satisfies the critical need for a safer way to carry wooden panels. The improved carrying technique should be easy to use and inexpensive in order to gain wide acceptance in the construction industry. In the detailed description that follows, like element numerals are used to identify like elements in one or more of the figures.

Referring now to FIGS. 2–4, a panel handle 10 of the present invention is illustrated. The panel handle 10 comprises a handle 12 having a gripping portion 14 disposed at a proximal end 16 of the handle. As illustrated, the handle 12 has a tubular shape, though it should be apparent that other shapes are possible, such as rectangular. To provide a high strength, lightweight construction, the handle 12 may be comprised of an aluminum or steel pipe or dowel. The gripping portion 14 may be comprised of rubber or plastic material with contours that fit with a construction worker's hand. The gripping portion 14 may be either slipped over the proximal end 16 of the handle 12, or may be permanently formed over the proximal end. Alternatively, the gripping portion 14 and handle 12 may be unitarily formed or machined from a single type of material, such as high-impact plastic or aluminum.

At the distal end 18 of the handle 12, a plurality of interconnected wall members 20 are coupled together and to the handle. The interconnected wall members 20 further include a central wall member 22, a left wall member 24 and a right wall member 26. Each of the wall members are rectangular in shape, and are combined in a rectangular U-shaped configuration. The central wall member 22 is coupled to each of the left wall member 24 and the right wall member at opposite sides thereof. The wall members 20 may be coupled together by conventional technique, such as welding or brazing. Alternatively, the wall members 20 may be formed from a single piece of material, such as by milling or extruding a single length of aluminum material.

The interconnected wall members 20 define a rectangular channel 28 that extends in a direction perpendicular to an axial direction of the handle 12. The interconnected wall members 20 may be joined to the distal end 18 of the handle 12 by a flush coupling of the end of the handle to one of the side wall members, such as the left wall member 24 as illustrated. Alternatively, the handle 12 may be coupled to the back side of the central wall member 22 using a ring or other such fitting known in the art. The handle 12 and wall members may be joined by welding or brazing, or alternatively, a threaded, bolted or riveted construction may be utilized.

The rectangular channel 28 defined by the interconnected wall members 20 provides an engagement point for removably attaching the panel handle 10 to a workpiece intended to be carried. To secure the workpiece in the channel 28, a plurality of set screws 32 extend through holes defined in each of the left and right wall members 24, 26. In a preferred embodiment, four set screws 32 are used with each of the left and right wall members 24, 26, although a lesser or greater number may also be advantageously utilized. Each one of the set screws 32 may have a knurled head 34 that extends outwardly of the left and right wall members 24, 26 that can be readily turned by the construction worker by hand without need for additional tools. Alternatively, a hex-head, phillips, allen-head or standard slotted screwdriver head may be utilized instead of the knurled head. The opposite end of the set screws 32 that extends inwardly of the left and right wall members 24, 26 and into the rectangular channel 28 as a pointed end 36. In the preferred embodiment, the pointed ends 36 of the set screws 32 should protrude at least ⅜ inch into the rectangular channel 28. This way, the pointed ends 36 will be able to dig into the workpiece in order to provide a strong connection.

It should be apparent that alternative connective elements may be utilized instead of the set screws 32. For example, nail holes may be provided in the wall members 20, and the wall members may be connected to a workpiece by driving nails through the nail holes and into the workpiece. In another example, a clamping type of arrangement may also be utilized. Lastly, angled teeth may extend inwardly from the interior surfaces of the wall members 20. Such angled teeth would dig into the workpiece and maintain a connection by use of gravity.

Referring now to FIGS. 1 and 2, the panel handle 10 is illustrated in use with an exemplary wooden panel 40. The panel 40 comprises a sheet of plywood 42 that provides a form surface for concrete construction. A plurality of studs 44 extend lengthwise along a rear surface of the plywood sheet 42. The panel handle 10 engages one of the studs by fitting the interconnected wall members 20 over the stud so that the stud fits snugly within the rectangular channel 28. The set screws 32 are then tightened to form a rigid connection between the interconnected wall members 20 and the stud. Once such a connection is made, a construction worker may lift the panel 40 by grasping the gripping portion 14 of the handle 12. After the panel 40 is carried to the appropriate place, the panel handle 10 may be removed from the stud by reversing the set screws 32 to disengage the pointed ends 36 from the stud.

It should be apparent that the handle 12 should be of sufficient length to provide an adequate grip, without being too long to be cumbersome or put undue stress on the connection point with the interconnected wall members 20. In a preferred embodiment of the panel handle 10, the handle may have an overall length of approximately eight inches. A width dimension of the rectangular channel must be sufficient to permit a standard-sized stud to be engaged therein, and in a preferred embodiment of the panel handle 10, a width of approximately two inches is utilized.

The panel handle 10 of the present invention allows the panels 40 to be picked up and carried in much less time than the previous known techniques. Further, the panels can be easily and safely carried in an upright position which allows the construction worker better visibility over the path before them.

Having thus described a preferred embodiment of the panel handle, it should be apparent to those skilled in the art that certain advantages of the within system have been achieved. It should also be appreciated that various modifications, adaptations, and alternative embodiments thereof may be made within the scope and spirit of the present invention. The invention is further defined by the following claims.

What is claimed is:

1. A carrying apparatus, comprising:

a substantially straight handle;

a gripping portion disposed at a first end of said handle;

a plurality of interconnected rectangular wall members defining a rectangular channel having a fixed spacing therein that extends in a direction perpendicular to an axial direction of said handle, one of said wall members being rigidly flush coupled perpendicularly to a second end of said handle opposite said first end; and means for removably attaching said interconnected wall members to a workpiece to be carried.

* * * * *